US012092321B2

(12) United States Patent
Lipowicz

(10) Patent No.: US 12,092,321 B2

(45) **Date of Patent: *Sep. 17, 2024**

(54) ELECTRONIC VAPING DEVICE AND COMPONENTS THEREOF

(71) Applicant: Altria Client Services LLC, Richmond, VA (US)

(72) Inventor: Peter Lipowicz, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,908

(22) Filed: Feb. 1, 2023

(65) Prior Publication Data

US 2023/0175684 A1 Jun. 8, 2023

Related U.S. Application Data

(62) Division of application No. 14/882,665, filed on Oct. 14, 2015, now Pat. No. 11,578,863.

(Continued)

(51) Int. Cl.

*A24F 40/46* (2020.01)
*F22B 1/28* (2006.01)

(Continued)

(52) U.S. Cl.

CPC .............. *F22B 1/282* (2013.01); *A24F 40/46* (2020.01); *H05B 3/0014* (2013.01); *H05B 3/12* (2013.01);

(Continued)

(58) Field of Classification Search

CPC ........ F23B 1/282; A24F 47/008; A24F 40/10; A24F 40/40; A24F 40/44; A24F 40/46;

(Continued)

(56) References Cited

U.S. PATENT DOCUMENTS 5,249,586 A * 10/1993 Morgan .................. A24F 40/46 131/194
5,388,594 A * 2/1995 Counts .................. A24F 40/485 131/194

(Continued)

FOREIGN PATENT DOCUMENTS

CN 103689812 A 4/2014
CN 203762288 U 8/2014

(Continued)

OTHER PUBLICATIONS

Israeli Office Action for corresponding Application No. 251279, dated Mar. 26, 2023.

(Continued)

*Primary Examiner* — Justin C Dodson
(74) *Attorney, Agent, or Firm* — Harness, Dickey & Pierce, P.L.C.

(57) ABSTRACT

A reservoir component of an electronic vaping device includes an outer housing, an air inlet, a vapor outlet, an air passage communicating with the air inlet and the vapor outlet, and a reservoir. A magnetic, electrically conductive and resistive heater element is located adjacent the air passage. The heater element is configured to be in electrical communication with an alternator of a power supply component. A wick is in communication with the reservoir and is configured to draw pre-vapor formulation from the reservoir toward the heater element. The heater element is configured to heat pre-vapor formulation to a temperature sufficient to vaporize the pre-vapor formulation and form a vapor.

10 Claims, 5 Drawing Sheets

Related U.S. Application Data

(60) Provisional application No. 62/064,065, filed on Oct. 15, 2014.

(51) Int. Cl.

| | |
|---|---|
| ***H05B 3/00*** | (2006.01) |
| ***H05B 3/12*** | (2006.01) |
| ***H05B 3/56*** | (2006.01) |
| ***H05B 6/10*** | (2006.01) |
| ***H05B 6/36*** | (2006.01) |
| *A24F 40/10* | (2020.01) |

(52) U.S. Cl.
CPC ................. *H05B 3/56* (2013.01); *H05B 6/10* (2013.01); *H05B 6/36* (2013.01); *A24F 40/10* (2020.01); *H05B 2203/021* (2013.01); *H05B 2203/022* (2013.01)

(58) Field of Classification Search
CPC .......... H05B 3/0014; H05B 3/12; H05B 3/56; H05B 6/10; H05B 6/36
See application file for complete search history.

(56) References Cited

U.S. PATENT DOCUMENTS

| | | | | |
|---|---|---|---|---|
| 5,878,752 | A | 3/1999 | Adams et al. | |
| 7,942,147 | B2 | 5/2011 | Hodges et al. | |
| 11,578,863 | B2 | 2/2023 | Lipowicz | |
| 2006/0193611 | A1 | 8/2006 | Ruiz Ballesteros et al. | |
| 2010/0000980 | A1* | 1/2010 | Popescu | A47J 36/2466 219/201 |
| 2011/0126848 | A1 | 6/2011 | Zuber et al. | |
| 2011/0226236 | A1 | 9/2011 | Buchberger | |
| 2012/0145702 | A1 | 6/2012 | Miller et al. | |
| 2012/0205361 | A1 | 8/2012 | Shimotsu | |
| 2013/0087160 | A1 | 4/2013 | Gherghe | |
| 2013/0192615 | A1 | 8/2013 | Tucker et al. | |
| 2013/0192617 | A1 | 8/2013 | Thompson | |
| 2013/0192623 | A1* | 8/2013 | Tucker | H01C 17/00 131/329 |
| 2013/0206154 | A1 | 8/2013 | Fernando et al. | |
| 2013/0213418 | A1* | 8/2013 | Tucker | A24F 40/42 131/328 |
| 2013/0213419 | A1* | 8/2013 | Tucker | A24F 40/46 131/328 |
| 2013/0340750 | A1 | 12/2013 | Thorens et al. | |
| 2014/0028423 | A1 | 1/2014 | Matsumoto et al. | |
| 2014/0064714 | A1 | 3/2014 | Ques Ramos et al. | |
| 2014/0074082 | A1 | 3/2014 | Denis et al. | |
| 2014/0109921 | A1* | 4/2014 | Chen | A24F 40/44 131/273 |
| 2014/0270729 | A1 | 9/2014 | DePiano et al. | |

FOREIGN PATENT DOCUMENTS

| | | | |
|---|---|---|---|
| DE | 69724559 | T2 | 7/2004 |
| DE | 202013010986 | U1 | 2/2014 |
| EP | 0371645 | A1 | 6/1990 |
| EP | 0703735 | A1 | 4/1996 |
| EP | 2327318 | A1 | 6/2011 |
| GB | 2504074 | A | 1/2014 |

OTHER PUBLICATIONS

Malaysian Office Action dated Feb. 22, 2023, for corresponding Malaysian Application No. PI 2017000490.

International Search Report PCT/ISA/210 for International Application No. PCT/US15/55429 Dated Jan. 6, 2016.

Written Opinion of the International Searching Authority PCT/ISA/237 for International Application No. PCT/US15/55429 dated Jan. 6, 2016.

International Preliminary Report for Application No. PCT/US2015/055429 dated Apr. 18, 2017.

Partial European Search Report for Application No. PCT/US2015055429 dated May 18, 2018.

European Search Report for Application No. 15851050.3-1204 dated Oct. 4, 2018.

Eurasian Office Action for corresponding Application No. 201790835 dated Dec. 14, 2018.

First Chinese Office Action for corresponding Application No. 201580055849.1, dated Jun. 4, 2019, English translation thereof.

Eurasian Office Action for corresponding Application No. 201790835, dated Dec. 3, 2019, English translation thereof.

Chinese Office Action for corresponsing Application No. 201580055849.1, dated Feb. 3, 2020, English translation thereof.

European Examination Report for corresponding Application No. 15851050.3, dated Jun. 15, 2020.

Office notification issued Sep. 30, 2020 in Israeli Application No. 251279.

Chinese Office Action dated Oct. 19, 2020 for corresponding Chinese Application No. 201580055849.1, and English-language translation thereof.

Zhao, Kaihua, et al., "Electromagnetics, Book II", People's Education Press, Jul. 1978, pp. 15-17.

Ukrainian Office Action dated Nov. 9, 2020 for corresponding Ukrainian Application No. a201704593, and English-language translation thereof.

Malaysian Office Action dated Oct. 5, 2021 for corresponding Malaysian Application No. PI 2017000490.

Israeli Office Action for corresponding Application No. 251279, dated Nov. 7, 2021.

European Examination Report for corresponding Application No. 15851050.3, dated Apr. 12, 2022.

Israeli Office Action for corresponding Application No. 305650, dated Mar. 12, 2024.

* cited by examiner

ELECTRONIC VAPING DEVICE AND COMPONENTS THEREOF

PRIORITY STATEMENT

This application is a divisional application of U.S. application Ser. No. 14/882,665, filed on Oct. 14, 2015, which is a non-provisional application that claims priority to U.S. Provisional Application No. 62/064,065, filed on Oct. 15, 2014, the entire contents of each of which is incorporated by reference in its entirety.

BACKGROUND

Field

Electronic vaping devices may include a heater configured to heat a pre-vapor formulation to form a vapor.

Description of Related Art

Electronic vaping devices may include a first section coupled to a second section via a threaded connection. The first section may be a replaceable cartridge, and the second section may be a reusable fixture. The second section may include a power source. The first section may include a heater and a pre-vapor formulation reservoir. The heater is configured to heat the pre-vapor formulation to a temperature sufficient to form a vapor.

SUMMARY

At least one example embodiment relates to an electronic vaping device including a magnetic heating element.

In at least one example embodiment, a reservoir component of an electronic vaping device includes an outer housing extending in a longitudinal direction, an air inlet, a vapor outlet, an air passage communicating with the air inlet and the vapor outlet, a reservoir, a magnetic, electrically conductive and resistive heater element located adjacent the air passage, and a wick in communication with the reservoir. The magnetic, electrically conductive and resistive heater element is configured to be in electrical communication with an alternator. The alternator is configured to drive the magnetic, electrically conductive and resistive heater element. The wick is configured to draw pre-vapor formulation from the reservoir toward the magnetic, electrically conductive and resistive heater element.

In at least one example embodiment, the magnetic, electrically conductive and resistive heater element is formed of an alloy including at least one of nickel, iron, molybdenum, chromium, aluminum, and copper.

In at least one example embodiment, the magnetic, electrically conductive and resistive heater element is formed of a permalloy-based magnetic material.

In at least one example embodiment, the magnetic, electrically conductive and resistive heater element has a generally circular cross-section. The magnetic, electrically conductive and resistive heater element may be generally sinuously shaped or generally U-shaped. The magnetic, electrically conductive and resistive heater element may have a generally rectangular cross-section.

In at least one example embodiment, the magnetic, electrically conductive and resistive heater element has an end to end length ranging from about 4 mm to about 25 mm. The magnetic, electrically conductive and resistive heater element has a circular cross-section with a diameter ranging from about 0.2 to about 0.5 mm.

In at least one example embodiment, the magnetic, electrically conductive and resistive heater element includes leads in electrical communication with electrical contacts of the reservoir component. The electrical contacts of the reservoir portion protrude from a seal end of the reservoir component.

In at least one example embodiment, the magnetic, electrically conductive and resistive heater element is formed of a Mu-metal.

In at least one example embodiment, a power supply component of an electronic vaping device includes an outer housing extending in a longitudinal direction, a power source, an alternator in electrical communication with the power source configured to produce an alternating current when powered by the power source, and a magnetic, electrically conductive and resistive heater element positioned adjacent an end of the power supply component. The magnetic, electrically conductive and resistive heater element is in electrical communication with the alternator which is configured to drive the magnetic, electrically conductive and resistive heater element with the alternating current, such that a current density of the alternating current through the magnetic, electrically conductive and resistive heater element concentrates at an outer surface thereof which causes the outer surface to increase in temperature when the alternator is powered by the power source.

In at least one example embodiment, the magnetic, electrically conductive and resistive heater element is formed of an alloy including at least one of nickel, iron, molybdenum, chromium, aluminum, and copper.

In at least one example embodiment, the magnetic, electrically conductive and resistive heater element is formed of a permalloy-based magnetic material.

In at least one example embodiment, the magnetic, electrically conductive and resistive heater element has a generally circular cross-section. The magnetic, electrically conductive and resistive heater element may be generally sinuously shaped or generally U-shaped.

In at least one example embodiment, the magnetic, electrically conductive and resistive heater element has an end to end length ranging from about 4 mm to about 25 mm. The magnetic, electrically conductive and resistive heater element has a circular cross-section with a diameter ranging from about 0.2 to about 0.5 mm.

In at least one example embodiment, the magnetic, electrically conductive and resistive heater element contacts the seal end of the power supply component. The magnetic, electrically conductive and resistive heater element protrudes from the seal end of the power supply component.

In at least one example embodiment, the magnetic, electrically conductive and resistive heater element is formed of a Mu-metal. The magnetic, electrically conductive and resistive heater element may have a generally rectangular cross-section.

In at least one example embodiment, a method of producing a vapor from an electronic vaping device includes drawing a portion of a pre-vapor formulation from a reservoir towards a magnetic, electrically conductive and resistive heater element and vaporizing at least some of the drawn portion of the pre-vapor formulation by driving a magnetic, electrically conductive and resistive heater element with an alternating current by an alternator in electrical communication with a power source responsive to a generated signal, such that current density through the magnetic, electrically conductive and resistive heater element concentrates along an outer surface of the magnetic, electrically conductive and resistive heater element to resistively heat the outer surface of the magnetic, electrically conductive and resistive heater element to a temperature sufficient to vaporize at least a portion of the drawn pre-vapor formulation to form a vapor.

In at least one example embodiment, an electronic vaping device includes a pre-vapor formulation, a magnetic, electrically conductive and resistive heater element in proximity of at least a portion of said pre-vapor formulation, a source of alternating current, and an arrangement to responsively communicate the heater element with the source, such that magnetism in the heater element and the alternating current of the source heats a surface portion of the heater element such that the pre-vapor formulation is at least partially vaporized. The electronic vaping device has a uniform diameter of less than about 10 mm.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
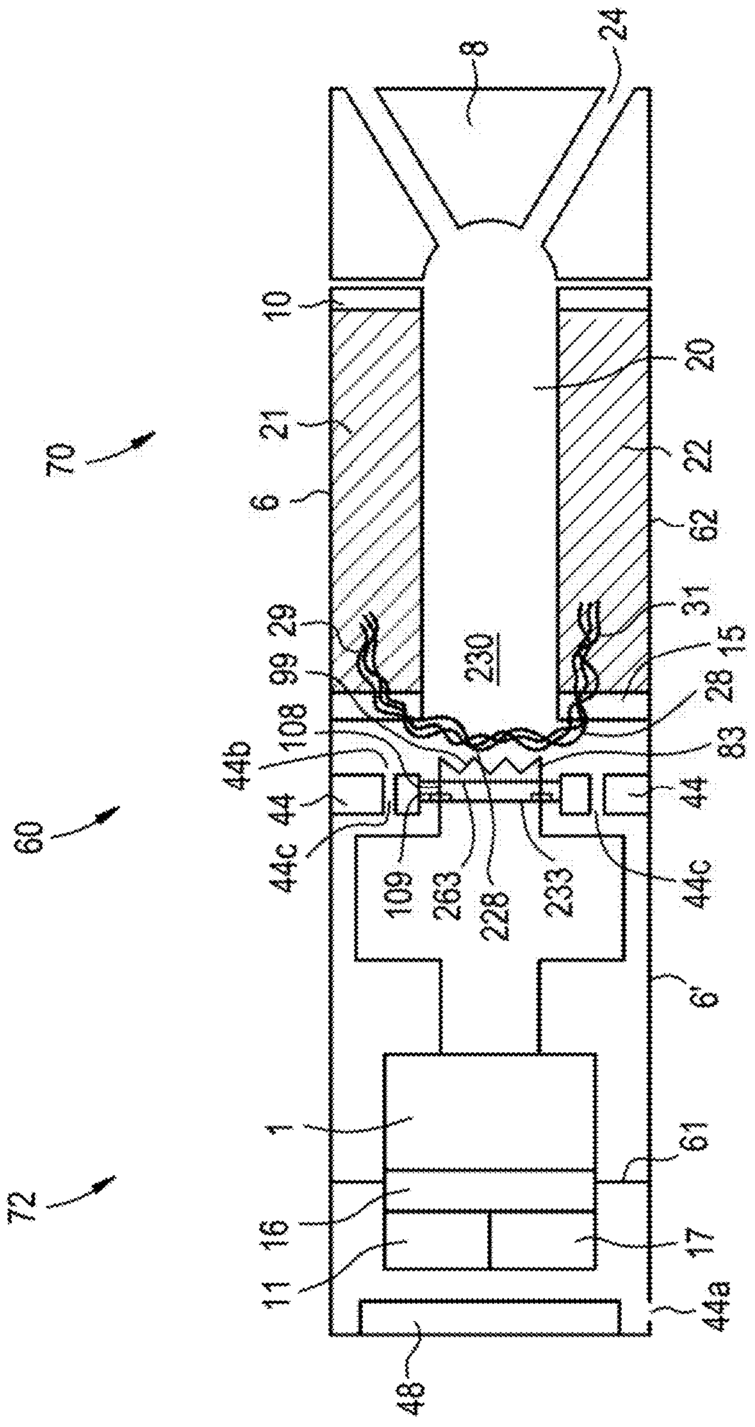
FIG. 1 is a cross-sectional view of an electronic vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of example embodiments.

Moreover, when the words "generally" and "substantially" are used in connection with geometric shapes, it is intended that precision of the geometric shape is not required but that latitude for the shape is within the scope of the disclosure. When used with geometric terms, the words "generally" and "substantially" are intended to encompass not only features which meet the strict definitions but also features which fairly approximate the strict definitions.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

At least one example embodiment is related to an electronic vaping device including a magnetic heater element.

Figure 2:
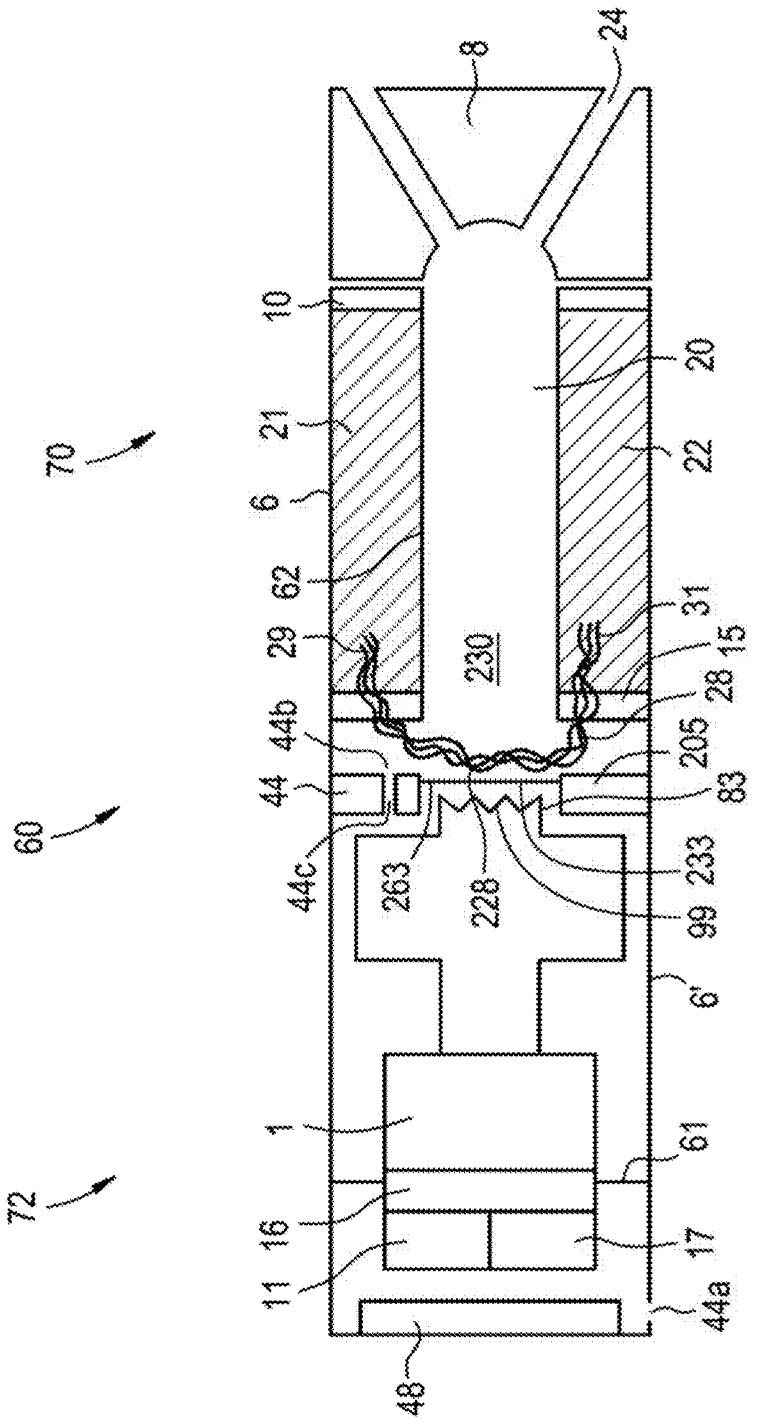
FIG. 2 is a cross-sectional view of an electronic vaping device according to at least one example embodiment.

In at least one example embodiment, as shown in FIGS. 1 and 2, an electronic vaping device 60 comprises a reservoir component (first or cartridge section) 70 and a power supply component (battery section) 72. The power supply component may be reusable. The reservoir component 70 includes an outer housing 6 extending in a longitudinal direction, an air inlet 44, a vapor outlet 24, an air passage, such as a central air passage 20, communicating with the air inlet 44 and the vapor outlet 24, and a reservoir 22. A magnetic, electrically conductive and resistive heater element 99 (hereinafter "magnetic heater element 99") made of a magnetic material is located adjacent the air passage wherein the magnetic heater element 99 is in electrical communication with an alternator 11 through leads 83. The alternator 11 is configured to drive the magnetic heater element 99 with an alternating current when the alternator 11 is powered by a power source 1 included in the power supply component 72.

The outer housing 6 and/or the inner tube 62 may be formed of any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK), ceramic, and polyethylene. The material is light and non-brittle.

In at least one example embodiment, as shown in FIGS. 1 and 2, the reservoir component 70 may also include a mouth-end insert, such as a multi-port mouth-end insert 8 having two or more, off-axis, diverging outlets 24. In embodiments, the mouth-end insert 8 may include four outlets 24. Alternatively, the mouth-end insert 8 may have a single outlet 24. The mouth-end insert 8 is in fluid communication with the central air passage 20.

In at least one example embodiment, the electronic vaping device 60 is about the same size as a cigarette. The electronic vaping device 60 may be about 80 mm to about 110 mm long, or about 80 mm to about 100 mm long, and up to about 10 mm or greater in diameter. In at least one example embodiment, the electronic vaping device is about 84 mm long and has a diameter of about 7.8 mm. In at least one example embodiment, the electronic vaping device 60 may be in a size and form approximating a cigar or a pipe.

In at least one example embodiment, as illustrated in FIG. 1, the reservoir component 70 includes the magnetic heater element 99. In another example embodiment, as illustrated in FIG. 2, the power supply component 72 includes the magnetic heater element 99.

In at least one example embodiment, a wick 28 is in communication with the reservoir 22. The wick 28 is configured to draw a pre-vapor formulation from the reservoir 22 toward the magnetic heater element 99. The magnetic heater element 99 is configured to heat the pre-vapor formulation to a temperature sufficient to vaporize the pre-vapor formulation and form a vapor in the air passage (e.g., central air passage 20) when the magnetic heater element 99 is driven by the alternator 11. The alternator 11 is configured to drive the magnetic heater element 99 with the alternating current such that a current density of the alternating current through the magnetic heater element 99 concentrates at an outer surface thereof, which causes the outer surface to increase to a temperature sufficient to vaporize the pre-vapor formulation and form a vapor in the air passage (e.g. the central air passage 20) when powered by the power source 1.

A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol.

The pre-vapor formulation has a boiling point suitable for use in the electronic vaping device 60. If the boiling point is too high, the magnetic heater element 99 will not be able to vaporize the pre-vapor formulation in the wick 28. However, if the boiling point is too low, the pre-vapor formulation may vaporize prematurely without the magnetic heater element 99 being activated.

In at least one example embodiment, the reservoir component 70 may be disposable. The reservoir component 70 may be connectable to the reusable power supply component 72 at a connection 205. The connection 205 may be a threaded connection or by any other suitable connection, such as a snug-fit, detent, clamp, clasp and/or magnetic connection. Upon closure of the connection 205, the alternator 11 of the power supply component 72 is configured to generate the alternating current, when powered by the power source 1, such that current density through the magnetic heater element 99 concentrates towards an outer surface of the magnetic heater element 99 and resistively heats the outer surface of the magnetic heater element 99 to a temperature sufficient to vaporize the pre-vapor formulation being drawn towards the magnetic heater element 99 and form a vapor in the air passage.

Still referring to FIGS. 1 and 2, the reservoir component 70 comprises the outer housing 6 (such as a cylindrical outer tube or first outer housing), which extends longitudinally. The outer housing 6 includes one or more air inlets 44. In embodiments, the air inlets 44 may extend through the connection 205 such that air is supplied to an interior of the outer housing 6.

An inner tube 62 disposed within the outer housing 6 defines the central air passage 20. The central air passage 20 is straight and communicates with the one or more air inlets 44 and a vapor outlet 24. There may be two air inlets 44 that communicate with the central air passage 20. Alternatively, there may be three, four, five or more air inlets 44. If there are more than two air inlets, the air inlets 44 are located at different locations along the length and/or around the circumference of the electronic vaping device 60. Further, altering the size and number of air inlets 44 may also aid in establishing a desired resistance to draw of the electronic vaping device 60, and reduce generation of a whistling noise during a draw on the electronic vaping device 60.

In at least one example embodiment, each air inlet 44 may comprise a beveled entrance and an angled passageway. In an embodiment, the electronic vaping device 60 includes a pair of air inlets 44. Each of the air inlets 44 may be angled toward the mouth end of the electronic vaping device 60 at an angle in the range of about 35° to about 55° with respect to the longitudinal axis of the article 60, about 40° to about 50°, or about 45°. Such arrangement of air inlets 44 minimizes (abates) and/or reduces "whistling" noise during a draw on the electronic vaping device 60.

In at least one example embodiment, a reservoir 22 is established in an annular space between the outer housing 6 and the inner tube 62. The annular space is sealed by a first seal 15 and a second seal (or stopper) 10.

In at least one example embodiment, the reservoir 22 contains the pre-vapor formulation, and optionally, a storage medium 21 (i.e., fibrous medium). The storage medium 21 is configured to disperse the pre-vapor formulation in the reservoir 22. For example, the storage medium 21 may include one or more layers of gauze wrapped about the inner tube 62. The storage medium 21 comprises an outer wrapping of gauze surrounding an inner wrapping of gauze of the same or different material. In at least one example embodiment, the storage medium 21 of the reservoir 22 is constructed from an alumina ceramic in the form of loose particles, loose fibers, or woven or nonwoven fibers. In another example embodiment, the storage medium 21 is constructed from a cellulosic material such as cotton or gauze material or a polymer material, such as polyethylene terephthalate. The polymer material may be in the form of a woven fabric or in the form of a bundle of loose fibers. In at least one example embodiment, the storage medium 21 may be a sintered, porous, or foamed material.

In at least one example embodiment, the storage medium 21 comprises a fibrous material comprising cotton, polyethylene, polyester, rayon and combinations thereof. Fibers of the fibrous material have a diameter ranging in size from about 6 microns to about 15 microns (e.g., about 8 microns to about 12 microns or about 9 microns to about 11 microns). Also, the fibers are sized to be irrespirable and may have a cross-section which has a y-shape, cross shape, clover shape or any other suitable shape. In at least one example embodiment, the reservoir 22 may comprise a filled tank lacking a storage medium 21.

In at least one example embodiment, the wick 28 may be constructed of a flexible, filamentary material. The wick 28 comprises a plurality of filaments having sufficient capillarity via interstitial spaces between the filaments to draw pre-vapor formulation from the reservoir 22 toward the magnetic heater element 99. The wick 28 may comprise a bundle of glass, ceramic, or metal filaments. The wick 28 may comprise windings of filaments wound together into separate bundles or strands, and the wick 28 comprises a plurality of such bundles. In at least one example embodiment, the wick 28 may include three or more bundles or strands of wound fiberglass filaments. In at least one example embodiment, the wick 28 may be a porous body.

In at least one example embodiment, the wick 28 may include filaments having a cross-section that is generally cross-shaped, clover-shaped, Y-shaped, or any other suitable shape.

In at least one example embodiment, the wick 28 includes any suitable material or combination of materials. Examples of suitable materials are glass filaments, fiberglass filaments, and ceramic, metal, or graphite based materials. The wick 28 may have any suitable capillarity to accommodate pre-vapor formulations having different physical properties such as density, viscosity, surface tension, and vapor pressure. The capillarity properties of the wick 28 and the properties of the pre-vapor formulation are selected such that the wick 28 is always wet in the area adjacent the magnetic heater element 99 to avoid overheating of the magnetic heater element 99 and/or the wick 28.

One advantage of the wick arrangement is that the pre-vapor formulation in the reservoir 22 is protected from oxygen (because oxygen cannot generally enter the reservoir 22 via the wick) so that the risk of degradation of the pre-vapor formulation is significantly reduced. Moreover, by using an opaque outer housing 6, the reservoir 22 is protected from light so that the risk of degradation of the pre-vapor formulation is significantly reduced. Thus, a high level of shelf-life and cleanliness may be maintained.

In at least one example embodiment, the magnetic heater element 99 may be a wire coil, which at least partially surrounds the wick 28. The wire coil may extend fully or partially around the circumference of the wick 28 with or without spacing between the turns of the coil.

In at least one example embodiment, the wire coil may contact the wick 28. In some example embodiments, the magnetic heater element 99 is not in contact with the wick 28. The magnetic heater element 99 is located adjacent to (in thermal communication with) the wick 28. The magnetic heater element 99 is configured to heat pre-vapor formulation on and/or in the wick 28 to a temperature sufficient to vaporize the pre-vapor formulation and form a vapor.

In at least one example embodiment, the magnetic heater element 99 is formed from an alloy including nickel, iron, molybdenum, chromium, aluminum, copper, or combinations thereof. In at least one example embodiment, the magnetic heater element 99 may be formed from a permalloy-based magnetic material. In embodiments, the magnetic heater element 99 may be formed from a Mu-metal. The magnetic heater element 99 may have a circular cross-section and may have a diameter of about 0.2 mm to about 0.5 mm. The magnetic heater element 99 may have an end to end length of about 4 mm to about 25 mm. The magnetic heater element 99 may be U-shaped or sinuously shaped. Other cross-sectional shapes and external forms may be employed. In at least one example embodiment, the magnetic heater element 99 may have an elongate planar form with a rectangular cross-section.

In at least one example embodiment, the wick 28 includes a transverse middle portion 228, which extends across and/or is adjacent to an opening in the first seal 15 and an inlet portion 230 of the central air passage 20. The wick 28 may include a first end portion 29 and a second end portion 31. The first end portion 29 and the second end portion 31 extend longitudinally through the first seal 15 into the confines of the reservoir 22 so as to contact the pre-vapor formulation in the reservoir 22. Notches may be provided at locations along the perimeter of the first seal 15 to accommodate placement of the end portions 29, 31 of the wick 28. The wick 28 may include only one end portion 29 in communication with the reservoir, and that the placement and routing of the portions of the wick 28 may be other than as described, so long as pre-vapor formulation is drawn from the reservoir 22 into proximate relation with the magnetic heater element 99 by the wick 28.

In at least one example embodiment, the magnetic heater element 99 is in thermal communication with the wick 28, and heats the pre-vapor formulation in the wick 28 by thermal conduction and convection. In at least one example embodiment, heat from the magnetic heater element 99 may be transferred to a stream of incoming ambient air that is drawn through the electronic vaping device 60 during use to form heated air that heats the vapour precursor by convection alone.

In at last one example embodiment, the magnetic heater element 99 is located adjacent the inlet portion 230 of the central channel 20 so as to promote fuller vapor formation by providing a generally straight flow path from the location of the magnetic heater element 99 to the interior of the multi-port mouth end insert 8. Such an arrangement may avoid and/or reduce abrupt changes in direction of air flow and vapor flow, and avoids associated losses due to impaction and other effects, which may otherwise impede vapor development and production. Also, the central air passage 20 minimizes and/or reduces contact and thermal transfer between the vapor and the walls of the reservoir 22 formed by the inner tube 62.

In at least one example embodiment, the power supply component 72 includes an outer housing 6' (second outer housing) extending in a longitudinal direction and includes the power source 1, such as a battery, in electrical communication with the magnetic heater element 99 through the alternator 11 and control circuitry 16.

In at least one example embodiment, the control circuitry 16 includes the alternator 11. The alternator 11 is configured to drive the magnetic heater element 99 by producing an alternating current when powered by the power supply 1 thereby causing the magnetic heater element 99 to resistively heat to a desired (or, alternatively a predetermined) temperature for a desired (or, alternatively a predetermined) time period. The alternator 11 provides an alternating current at a frequency of about 100 kHz to about 1 MHz wherein the frequency is selected based upon parameters of the magnetic heater element 99, such as the makeup (composition) and/or a cross-sectional diameter or shape of the magnetic heater element 99.

In at least one example embodiment, the control circuitry 16 communicates responsively with a sensor (e.g., pressure sensor) 17 that is located at a distal end portion of the power supply component 72. The sensor 17 is configured to generate a signal responsive to air being drawn from the electronic vaping device 60 through the vapor outlet 24. In response to the signal from the sensor 17, the control circuitry 16 communicates an alternating power cycle from the alternator 11, such that the alternator 11 drives the magnetic heater element 99 with an alternating current and current density through the magnetic heater element 99 concentrates at an outer surface of the magnetic heater element 99 to resistively heat the outer surface of the magnetic heater element 99. The pressure drop of a draw (or puff) upon the mouth-end insert 8 of the reservoir component 70 is communicated to the sensor 17 through openings **44*b* and 44*c* in components 70 and 72, respectively, adjacent the connector 205, and via spaces provided between the power source 1 and adjacent portions of the outer housing 6 of the power supply component 72. A partition 61 is provided at or adjacent the sensor 17 to isolate a pressure relief inlet 44*a* which is located at the distal end of the power supply component 72. The pressure relief inlet 44*a* serves to relieve pressure on its side of the sensor 17, which would otherwise interfere with facile operation of the sensor 17. In at least one example embodiment, the sensor 17 and control circuitry 16 may be a single chip. The chip may be an integrated circuit with resistors and timing circuits, inputs and outputs which may function to cause switching (i.e., supply power from the power source to the leads based on the puff sensor signal, and to cause an LED 48** to blink when power is low, etc.).

The control circuitry 16 may be configured to provide a power cycle that achieves optimal ramp-up in temperature of the magnetic heater element 99 and maintenance of an operating temperature for a desired (or, alternatively a predetermined) period of time. For example, the power cycle may be divided into two (or more) phases each having a respective time period of T1 and T2. In the first phase (T1), a higher frequency and magnitude of alternating current may be employed so as to rapidly cause the magnetic heater element 99 to heat. In the second phase (T2), the control circuitry 16 may provide a power cycle with a more moderate frequency and/or a more moderate magnitude of alternating current so as to achieve steady heating effect throughout the second phase (T2). Through testing, analytics, and/or modeling, a desired power cycle may be established. The power cycles could include a plurality of phases, such that only the amplitude or only the frequency is varied, and may include phases wherein there is no power and/or alternating current being directed through the magnetic heater element 99.

The control circuitry 16 is configured to adjust frequency, magnitude, and/or time period responsive to readings of battery voltage of the power supply 1 so that consistent performance is maintained as the voltage level of the power supply (i.e. battery) 1 declines during use.

The puff sensor 17 is configured to generate more than one signal, such as a range of signals responsive to the magnitude of a puff or draw upon the mouth-end insert 8 so that the control circuitry 16 may discriminate between the signals to adjust the frequency, magnitude, and/or time of the immediate power cycle in response to the signal it receives from the puff sensor 17. For instance a heavy draw might generate a first signal from the puff sensor 17, which in turn would cause the control circuitry to extend the time of the immediate power cycle responsively or make some other adjustment in the power cycle to provide a greater production of vapor.

When activated, the magnetic heater element 99 heats a portion of the wick 28 in thermal communication with the magnetic heater element 99 for less than about 10 seconds or less than about 7 seconds. Thus, the power cycle (or maximum puff length) may range in period from about 2 seconds to about 10 seconds (e.g., about 3 seconds to about 9 seconds, about 4 seconds to about 8 seconds, or about 5 seconds to about 7 seconds).

Alternatively, the control circuitry 16 may include a manually operable switch for an individual to initiate a puff. The time-period and characteristics of the alternating current supplied to the magnetic heater element 99 may be pre-set depending on the amount of pre-vapor formulation desired to be vaporized. The control circuitry 16 may be pre-programmed or programmable for this purpose. Alternatively, the control circuitry 16 may be configured to power the alternator 11 to drive the magnetic heater element 99 for as long as the puff sensor 17 detects a pressure drop.

Having a separate reservoir component 70 and power supply component 72 allows the wick 28 and reservoir 22 to be disposed of when the reservoir component 70 is depleted, and allows the power supply component 72 to be reusable. Thus, there will be no cross-contamination between different mouth-end inserts 8, for example, when using different pre-vapor formulations. Also, if the reservoir component 70 is replaced at suitable intervals, there is little chance of the wick 28 becoming clogged with pre-vapor formulation.

The battery or power source 1 may be a lithium-ion battery or one of its variants, for example a lithium-ion polymer battery. Alternatively, the battery may be a nickel-metal hydride battery, a nickel cadmium battery, a lithium-manganese battery, a lithium-cobalt battery, or a fuel cell. In that case, the electronic vaping device 60 is vapable by an adult vaper until the energy in the power source 1 is depleted. Alternatively, the power source 1 may be rechargeable and include circuitry allowing the battery to be chargeable by an external charging device. In that case, the circuitry, when charged, provides power for a pre-determined number of puffs, after which the circuitry must be re-connected to an external charging device.

The control circuitry 16 may also include a light emitting diode (LED) 48 configured to glow when the magnetic heater element 99 is activated. The LED 48 is at a distal end of the electronic vaping device 60 so that the LED 48 mimics the appearance of a burning coal during a puff. The LED 48 may be arranged to be visible to the smoker. In addition, the LED 48 may be utilized for electronic vaping device system diagnostics. The LED 48 may also be configured such that an individual may activate and/or deactivate the LED 48 for privacy, such that the LED 48 would not activate during use of the electronic vaping device if desired.

Figure 3:
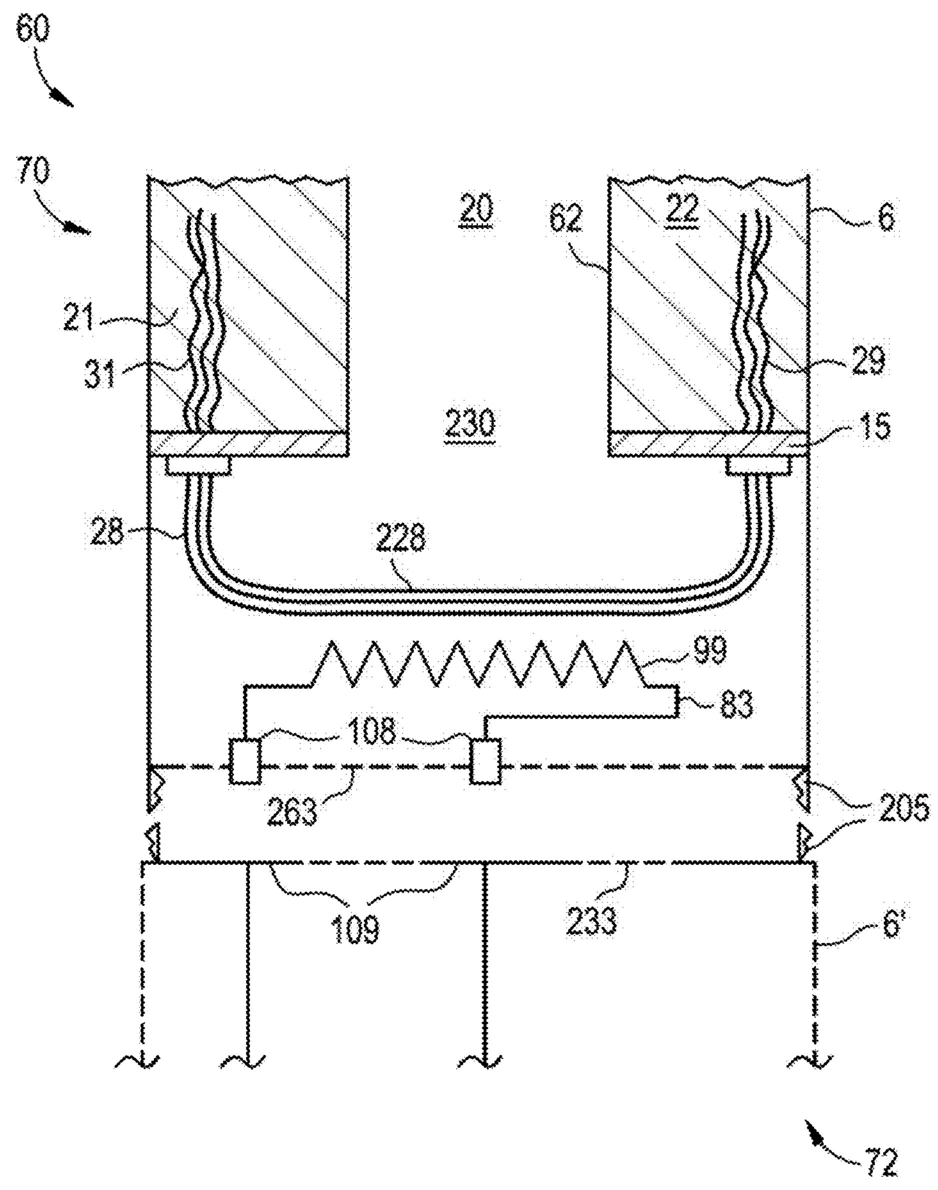
FIG. 3 is a cross-sectional view of an electronic vaping device according to at least one example embodiment.

As shown in FIG. 1, the magnetic heater element 99 is included in the reservoir component 70. FIG. 3 illustrates an exploded view of the connection between the reservoir component 70 and the power supply component 72 as illustrated in FIG. 1. Referring now to FIGS. 1 and 3, the reservoir component 70 may be connectable to the power supply component at the connection 205. When the reservoir component 70 is connected to the power supply component 72, electrical contacts 108 of the reservoir component 70 electrically connect to electrical contacts 109 of the power supply component 72. The electrical contacts 108 of the reservoir component 70 protrude from a seal end 263 of the reservoir component 70 and electrical contacts 109 of the power supply component 72 protrude from a seal end 233 of the power supply component 72 such that they may mate when the power supply component 72 and the reservoir component 70 are connected. In an embodiment, the seal end 233 of the power supply component 72 and the seal end 263 of the reservoir component 70 are formed of electrically insulating material. The electrical contacts 108 of the reservoir component 70 are in electrical communication with the magnetic heater element 99 through leads 83 and the electrical contacts 109 of the power supply component are in electrical communication with the power source 1, through the control circuitry 16, puff sensor 17, and alternator 11 such that a magnetic heater element circuit is formed when the reservoir component 70 and the power supply component 72 are connected.

Figure 4:
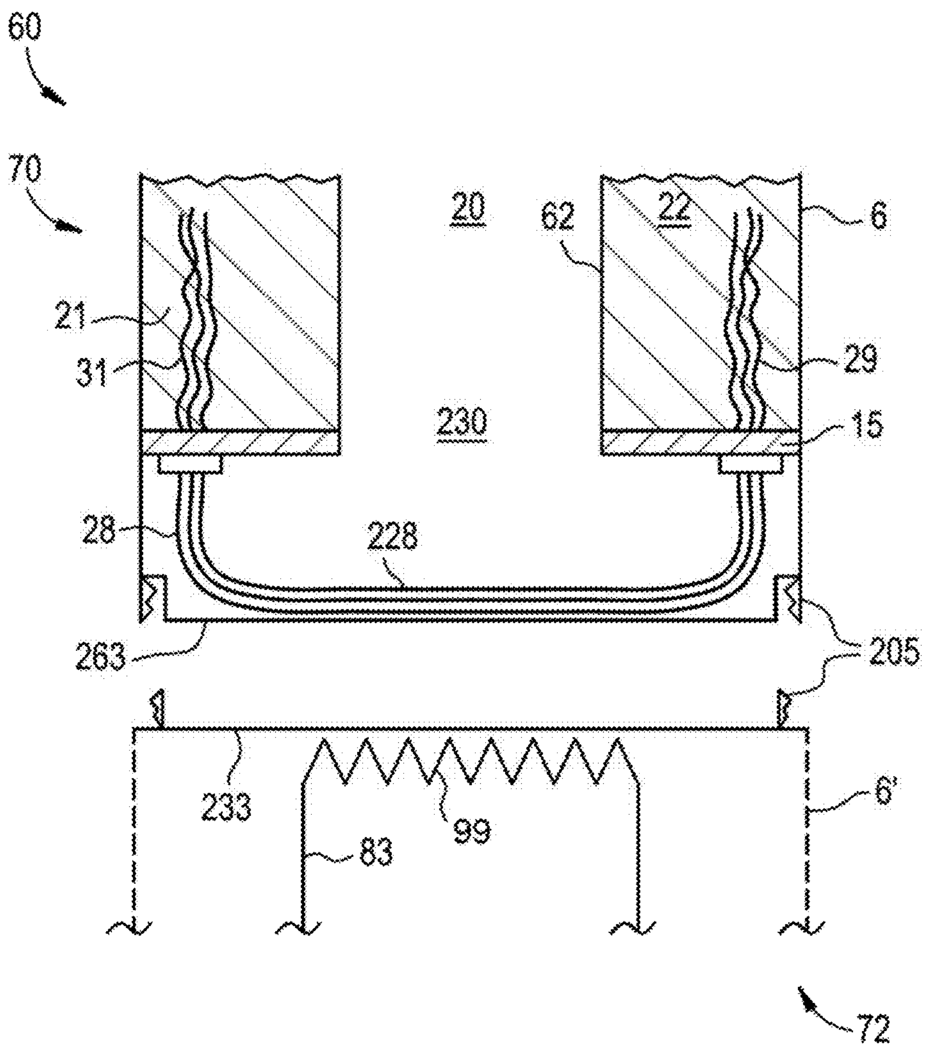
FIG. 4 is a cross-sectional view of an electronic vaping device according to at least one example embodiment.

In an alternative embodiment, as shown in FIG. 2, the magnetic heater element 99 may be included in the power supply component 72. FIG. 4 illustrates an exploded view of the connection between the reservoir component 70 and the power supply component 72 as illustrated in FIG. 2. Referring now to FIGS. 2 and 4, the reservoir component 70 may be connectable to the power supply component at the connection 205. The power supply component 72 includes the magnetic heater element 99 in electrical communication with the power source 1, the control circuitry 16, the puff sensor 17 and the alternator 11 through leads 83. The power supply component includes a seal end 233. The seal end 233 directly contacts a seal end 263 of the reservoir component 70 when the reservoir component 70 is connected to the power supply component 72 such that the seal ends 233 and 263 are formed of thermally conductive material. Thus, heat generated by that magnetic heater element 99 may be thermally transferred from the power supply component 72 to the wick 28 included in the reservoir component 70. In embodiments, the magnetic heater element 99 physically contacts the seal end 233 of the power supply component 72 and the wick physically contacts the seal end 263 of the reservoir component 70 such that heat may be directly conducted from the magnetic heater element 99 through the seal ends 233, 263 to the pre-vapor formulation contained on the wick 28 so as to vaporize the pre-vapor formulation on the wick 28. In embodiments, a portion of the magnetic heater element 99 may protrude through the seal end 233 and directing contact the seal end 263 of the reservoir component so that heat may be directly conducted from the magnetic heater element 99 through the seal end 263 to the pre-vapor formulation contained on the wick 28, and the pre-vapor formulation on the wick 28 may be vaporized.

Figure 5:
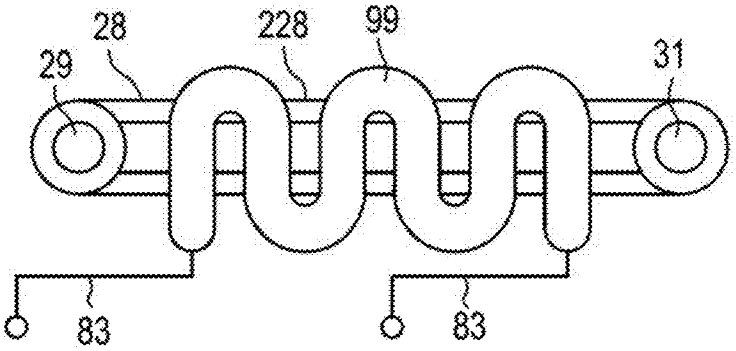
FIG. 5 illustrates an embodiment of a magnetic, electrically conductive and resistive heater element and wick arrangement according to at least one example embodiment.

As shown in FIG. 5, in embodiments, the magnetic heater element 99 is adjacent a wick 28. As shown, leads 83 are electrically connected to the magnetic heater element 99 such that the leads 83 may electrically connect the magnetic heater element 99 to the power supply 1, control circuitry 16, puff sensor 17, and alternator 11. The magnetic heater element 99 has a sinuous shape which extends along a length of a transverse portion 228 of the wick 28. The wick 28 may directly contact a portion of the magnetic heater element 99. In an alternate embodiment, the magnetic heater element 99 may be U-shaped, rectangular in cross-section, or have another form.

The magnetic heater element 99 has a high relative magnetic permeability of about 1,000 or greater (wherein wood has a value of 1 and pure iron has a value of 200,000).

Figure 6:
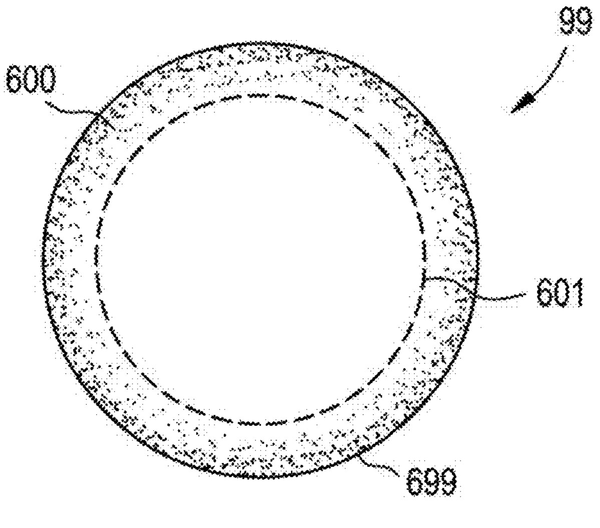
FIG. 6 illustrates current density through a cross section of the magnetic, electrically conductive and resistive heater element according to at least one example embodiment.

FIG. 6 illustrates current density through a cross section of the magnetic heater element 99 when the magnetic heater element 99 is driven by the alternating current supplied by the alternator 11.

The magnetic heater element 99 has a circular cross-section. When an alternating current is supplied through the magnetic heater element 99, the current density 600 through the magnetic heater element 99 concentrates at an outer surface 699 thereof due to the skin effect. Skin effect is the tendency for an alternating current to concentrate at or near the outer part or "skin" of a conductor, such as the outer surface 699 of the magnetic heater element 99. When the alternating current is supplied through the magnetic heater element 99, the current is displaced more and more to the outer surface 699 as the frequency of the alternating current increases.

A mathematical description of skin effect may be derived from Maxwell's equations, for simple shapes, including cylindrical, tubular and flat conductors, each of which may be used as the cross sectional shape of the magnetic heater element 99. For example, for a plane conductor carrying a sinusoidal alternating current, the current density is a maximum at the surface and its magnitude decreases exponentially with distance into the conductor. The skin depth or penetration depth $\delta$ is frequently used in assessing the results of skin effect. More specifically, skin depth is the depth below the conductor surface at which the current density has decreased to 1/e (approximately 37%) of its value at the surface and is given by Equation 1, shown below, wherein p is the resistivity of the conductor, $\omega$ is the angular frequency of the current, and $\mu$ is the absolute magnetic permeability of the conductor. This concept applies to plane solids, but may be extended to other shapes provided the radius of curvature of the conductor surface is appreciably greater than $\delta$.

$$\delta=(2p/\omega\mu)^{1/2} \quad \text{Equation 1:}$$

According to at least one example embodiment disclosed herein, the cross sectional diameter of the magnetic heater element 99 is greater than the skin depth (δ) 601 of the magnetic heater element 99.

Practicing under the teachings herein provides advantages including, for a given battery, the magnetic heater element may be made with a larger cross sectional area and is therefore more rugged and manageable so as to facilitate handling and automated manufacturing. In addition, the teachings may lead to enhanced operational efficiencies, because surface portions of the magnetic heater element adjacent the pre-vapor formulation are heated.

Whereas the embodiments are described as being cylindrical, other suitable forms include right angular, triangular, oval, oblong, or other cross-sections.

It will now be apparent that a new, improved, and non-obvious electronic vaping device has been described in this specification with sufficient particularity as to be understood by one of ordinary skill in the art. Moreover, it will be apparent to those skilled in the art that modifications, variations, substitutions, and equivalents exist for features of the electronic vaping device, which do not materially depart from the spirit and scope of the embodiments disclosed herein. Accordingly, it is expressly intended that all such modifications, variations, substitutions, and equivalents which fall within the spirit and scope of the invention as defined by the appended claims shall be embraced by the appended claims.

I claim:

1. A power supply component of an electronic vaping device comprising:

an outer housing extending in a longitudinal direction, the outer housing including a seal;

a power source;

a heater element protruding through the seal of the power supply component, the seal of the power supply component configured to contact an end of a reservoir component such that the heater element is configured to directly contact the end of the reservoir component, the heater being magnetic and electrically conductive; and an alternator in electrical communication with the power source, the alternator configured to produce an alternating current when powered by the power source, the alternator configured to drive the magnetic and electrically conductive heater element with the alternating current.

2. The power supply component of claim 1, wherein the heater element is formed of an alloy including nickel, iron, molybdenum, chromium, aluminum, copper, or any combination thereof.

3. The power supply component of claim 1, wherein the heater element is formed of a permalloy magnetic material.

4. The power supply component of claim 1, wherein the heater element has a generally circular cross-section.

5. The power supply component of claim 1, wherein the heater element is generally sinuously shaped.

6. The power supply component of claim 1, wherein the heater element is generally U-shaped.

7. The power supply component of claim 1, wherein the heater element has an end to end length ranging from about 4 mm to about 25 mm.

8. The power supply component of claim 1, wherein the heater element has a circular cross-section with a diameter ranging from about 0.2 to about 0.5 mm.

9. The power supply component of claim 1, wherein the heater element comprises a Mu-metal.

10. The power supply component of claim 1, wherein the heater element has a generally rectangular cross-section.

* * * * *